United States Patent
Shah et al.

(10) Patent No.: US 8,672,121 B2
(45) Date of Patent: Mar. 18, 2014

(54) METHODS AND APPARATUS FOR TRANSPORTING SUBSTRATE CARRIERS

(75) Inventors: Vinay K. Shah, San Mateo, CA (US); Jeffrey C. Hudgens, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 492 days.

(21) Appl. No.: 12/254,839

(22) Filed: Oct. 21, 2008

(65) Prior Publication Data

US 2009/0101483 A1    Apr. 23, 2009

Related U.S. Application Data

(60) Provisional application No. 60/981,818, filed on Oct. 22, 2007.

(51) Int. Cl.
*B65G 15/44* (2006.01)
*B65G 15/22* (2006.01)
*B65G 15/60* (2006.01)

(52) U.S. Cl.
USPC .................. 198/867.02; 198/842; 198/617

(58) Field of Classification Search
USPC .......................... 198/846, 847, 850
See application file for complete search history.

(56) References Cited

U.S. PATENT DOCUMENTS

| | | |
|---|---|---|
| 1,485,950 A | 3/1924 | Biedermann |
| 2,157,283 A | 5/1939 | Dyson |
| 2,268,542 A | 1/1942 | Bergmann |
| 2,689,638 A | 9/1954 | Mojonnier |
| 3,664,491 A | 5/1972 | Scanlon et al. |
| 3,682,295 A | 8/1972 | Roinestad |
| 3,710,921 A | 1/1973 | Petiet |
| 3,710,923 A | 1/1973 | Fromme et al. |
| 3,722,656 A | 3/1973 | Loomis, Jr. et al. |
| 3,730,331 A | 5/1973 | Goldberg |
| 3,734,263 A | 5/1973 | Dirks |
| 3,737,024 A | 6/1973 | Gelzer |
| 3,788,455 A | 1/1974 | Dieckmann |
| 3,815,723 A | 6/1974 | Wright et al. |
| 3,865,229 A | 2/1975 | Velander |
| 3,901,376 A | 8/1975 | Dardaine et al. |
| 3,967,721 A | 7/1976 | Rhoden |

(Continued)

FOREIGN PATENT DOCUMENTS

| | | |
|---|---|---|
| CN | 1238293 A | 12/1999 |
| CN | 1640795 A | 7/2005 |

(Continued)

OTHER PUBLICATIONS

International Search Report and Written Opinion dated Dec. 24, 2008, relating to International Application No. PCT/US08/80655.

(Continued)

*Primary Examiner* — Kavel Singh
(74) *Attorney, Agent, or Firm* — Dugan & Dugan, PC

(57) ABSTRACT

A conveyor apparatus adapted to transport and article is provided. The conveyor apparatus has a belt section including a plurality of slots and a plurality of T-shaped stiffeners extending in the slots. Respective belt sections may be spliced together using a plurality of T-shaped stiffeners extending through slots in diagonally-formed ends of each belt section. Methods of the invention are described as are numerous other aspects.

20 Claims, 9 Drawing Sheets

(56) References Cited

U.S. PATENT DOCUMENTS

| | | |
|---|---|---|
| 3,990,569 A | 11/1976 | Aiuola |
| 4,006,813 A | 2/1977 | Fluck |
| 4,029,194 A | 6/1977 | Feurstein et al. |
| 4,033,403 A | 7/1977 | Seaton et al. |
| 4,040,302 A | 8/1977 | Katarao |
| 4,044,886 A | 8/1977 | Sender |
| 4,084,687 A | 4/1978 | Lapeyre |
| 4,166,527 A | 9/1979 | Beezer |
| 4,222,479 A | 9/1980 | Dugan et al. |
| 4,261,236 A | 4/1981 | Verjux |
| 4,266,652 A | 5/1981 | Bald |
| 4,294,344 A | 10/1981 | van Maanen |
| 4,340,137 A | 7/1982 | Foster |
| 4,394,901 A * | 7/1983 | Roinestad .................. 198/850 |
| 4,401,522 A | 8/1983 | Buschow et al. |
| 4,450,950 A | 5/1984 | Foote, Jr. |
| 4,506,779 A | 3/1985 | Seragnoli |
| 4,524,858 A | 6/1985 | Maxey |
| 4,534,843 A | 8/1985 | Johnson et al. |
| 4,538,720 A | 9/1985 | Limousin |
| 4,540,088 A | 9/1985 | Bergh |
| 4,549,647 A | 10/1985 | Cosse |
| 4,552,261 A | 11/1985 | Raudat et al. |
| 4,584,944 A | 4/1986 | Dehne |
| 4,585,126 A | 4/1986 | Paddock et al. |
| 4,603,770 A | 8/1986 | Hartness |
| 4,650,264 A | 3/1987 | Dahnert |
| 4,653,630 A | 3/1987 | Bravin |
| 4,667,809 A | 5/1987 | Raybuck |
| 4,679,685 A | 7/1987 | Inoko |
| 4,680,919 A | 7/1987 | Hirama et al. |
| 4,693,359 A | 9/1987 | Mattei et al. |
| 4,702,365 A | 10/1987 | Pak |
| 4,708,727 A | 11/1987 | Cardenas-Franco et al. |
| 4,711,346 A | 12/1987 | Breher et al. |
| 4,720,006 A | 1/1988 | Lenherr |
| 4,750,605 A | 6/1988 | Brems et al. |
| 4,759,439 A | 7/1988 | Hartlepp |
| 4,765,453 A | 8/1988 | Bucher |
| 4,775,046 A | 10/1988 | Gramarossa et al. |
| 4,813,528 A | 3/1989 | Hartlepp |
| 4,830,180 A | 5/1989 | Ferguson et al. |
| 4,850,102 A | 7/1989 | Hironaka et al. |
| 4,852,717 A | 8/1989 | Ross et al. |
| 4,854,440 A | 8/1989 | Laube et al. |
| 4,855,174 A | 8/1989 | Kawamoto |
| 4,869,637 A | 9/1989 | deGroot |
| 4,898,373 A | 2/1990 | Newsome |
| 4,901,843 A | 2/1990 | Lashyro |
| 4,921,092 A | 5/1990 | Crawford et al. |
| 5,048,164 A | 9/1991 | Harima |
| 5,052,544 A | 10/1991 | Anderson |
| 5,086,909 A | 2/1992 | Powell, Jr. |
| 5,092,450 A | 3/1992 | Schommartz et al. |
| 5,099,896 A | 3/1992 | Ritola |
| 5,110,249 A | 5/1992 | Norman |
| 5,113,992 A | 5/1992 | Sadamori |
| 5,123,518 A | 6/1992 | Pfaff |
| 5,135,102 A | 8/1992 | Sjogren et al. |
| 5,184,712 A | 2/1993 | Leypold et al. |
| 5,207,309 A | 5/1993 | Simpkin et al. |
| 5,226,211 A | 7/1993 | Jones |
| 5,231,926 A | 8/1993 | Williams et al. |
| 5,261,935 A | 11/1993 | Ishii et al. |
| 5,269,119 A | 12/1993 | Tolson |
| 5,275,275 A | 1/1994 | Boldrini et al. |
| 5,303,818 A | 4/1994 | Gruettner et al. |
| 5,339,938 A | 8/1994 | Patin |
| 5,341,915 A | 8/1994 | Cordia et al. |
| 5,377,819 A | 1/1995 | Horton et al. |
| 5,439,091 A | 8/1995 | Mason |
| 5,549,195 A | 8/1996 | Aulagner et al. |
| 5,558,198 A | 9/1996 | Juarez |
| 5,560,471 A | 10/1996 | Prochut et al. |
| 5,573,106 A | 11/1996 | Stebnicki |
| 5,603,777 A | 2/1997 | Ohashi |
| 5,617,944 A | 4/1997 | McTaggart |
| 5,628,614 A | 5/1997 | Pazdernik et al. |
| 5,653,327 A | 8/1997 | Buday, Jr. et al. |
| 5,664,254 A | 9/1997 | Ohkura et al. |
| 5,667,056 A | 9/1997 | Kimmet |
| 5,762,544 A | 6/1998 | Zuniga et al. |
| 5,782,338 A | 7/1998 | Schuster et al. |
| 5,797,249 A | 8/1998 | Hartness |
| 5,823,319 A | 10/1998 | Resnick et al. |
| 5,827,118 A | 10/1998 | Johnson et al. |
| 5,829,574 A | 11/1998 | DelSanto |
| 5,829,939 A | 11/1998 | Iwai et al. |
| 5,865,292 A | 2/1999 | Aguilar et al. |
| 5,887,701 A | 3/1999 | Spatafora |
| 5,980,183 A | 11/1999 | Fosnight |
| 5,996,776 A | 12/1999 | Van Zijderveld |
| 6,036,426 A | 3/2000 | Hillman |
| 6,054,181 A | 4/2000 | Nanbu et al. |
| 6,092,979 A | 7/2000 | Miselli |
| 6,171,672 B1 | 1/2001 | Koike et al. |
| 6,183,186 B1 | 2/2001 | Peltola et al. |
| 6,209,710 B1 | 4/2001 | Mueller et al. |
| 6,223,887 B1 | 5/2001 | Andou |
| 6,227,345 B1 | 5/2001 | Miyamoto |
| 6,227,346 B1 | 5/2001 | Lecomte et al. |
| 6,227,348 B1 | 5/2001 | Frei et al. |
| 6,234,300 B1 | 5/2001 | De Vos et al. |
| 6,235,634 B1 | 5/2001 | Law et al. |
| 6,283,692 B1 | 9/2001 | Perlov et al. |
| 6,431,347 B1 | 8/2002 | Gossner |
| 6,435,331 B1 | 8/2002 | Olson et al. |
| 6,439,822 B1 | 8/2002 | Kimura et al. |
| 6,511,065 B1 | 1/2003 | Cote et al. |
| 6,579,052 B1 | 6/2003 | Bonora et al. |
| 6,581,750 B1 | 6/2003 | Tweedy et al. |
| 6,607,073 B2 | 8/2003 | Buchi et al. |
| 6,804,121 B2 | 10/2004 | Fischbach et al. |
| 7,051,870 B2 * | 5/2006 | Schoendienst et al. ........ 198/850 |
| 7,077,264 B2 * | 7/2006 | Rice et al. .................... 198/846 |
| 7,293,642 B2 | 11/2007 | Rice et al. |
| 7,367,446 B2 | 5/2008 | Rice et al. |
| 2002/0090282 A1 | 7/2002 | Bachrach |
| 2003/0010449 A1 | 1/2003 | Gramarossa et al. |
| 2003/0173191 A1 | 9/2003 | Hammock et al. |
| 2005/0109586 A1 | 5/2005 | Schoendienst |
| 2006/0243565 A1 | 11/2006 | Rice et al. |
| 2006/0260916 A1 | 11/2006 | Rice et al. |
| 2007/0108020 A1 | 5/2007 | Rice et al. |
| 2007/0278067 A1 | 12/2007 | Rice et al. |

FOREIGN PATENT DOCUMENTS

| | | |
|---|---|---|
| DE | 2701555 | 7/1978 |
| EP | 0 277 536 | 8/1988 |
| EP | 0 582 019 A1 | 2/1994 |
| EP | 0717717 B1 | 7/1999 |
| EP | 00735927 B1 | 11/1999 |
| EP | 0 987 750 A1 | 3/2000 |
| EP | 00912426 B1 | 8/2000 |
| EP | 1 134 641 A1 | 9/2001 |
| EP | 1 445 794 A2 | 1/2004 |
| JP | 63020151 A2 | 1/1988 |
| JP | 02098157 A | 4/1990 |
| JP | 03132691 A | 6/1991 |
| JP | 10-256346 | 9/1998 |
| JP | 00062949 A | 2/2000 |
| JP | 00335799 A | 12/2000 |
| JP | 2003072835 A | 3/2003 |
| WO | WO97/09256 A1 | 3/1997 |
| WO | WO99/64207 | 12/1999 |
| WO | WO99/67158 | 12/1999 |
| WO | WO00/69724 A1 | 11/2000 |
| WO | WO01/73678 A | 10/2001 |
| WO | WO02/19392 A1 | 3/2002 |

OTHER PUBLICATIONS

Virvalo, T.K., "Cylinder Speed Synchronization", Dec. 1978, Hydraulics and Pneumatics, vol. 31, No. 12, pp. 55-57.

(56) References Cited

OTHER PUBLICATIONS

Cheng, et al., "Adaptive Synchronization Control of a Robotic Manipulator Operating in an Intelligent Workcell", Apr. 1990, IEEE Transactions on Industrial Electronics, vol. 37, No. 2, pp. 119-126.

Shih-Hung Li, et al. "An Ultrahigh Speed Assembly Robot System. Part I. Design", 1994, Proceedings 1994 Japan—U.S.A. Symposium on Flexible Automation—A Pacific Rim Conference, vol. 2, pp. 465-472.

Roberts, et al., "Feed Chute Geometry for Minimum Belt Wear", Sep. 1998, 6th International Conference on Bulk Materials Storage, Handling and Transportation, pp. 153-159.

Saigo, et al., "Drive Control Systems for Processing Lines", Nov. 10, 2000, Fuji Jiho (Fuji Electric Journal), vol. 73, No. 11, pp. 45-49, Japanese language (Abstract only).

Saigo, K., "Variable-speed Drive Systems for Industrial Plants", Nov. 10, 2000, Fuji Jiho (Fuji Electric Journal), vol. 73, No. 11, pp. 10-14, Japanese language (Abstract only).

Park, et al., "Task Sequence Optimization for a Dual-Robot Assembly System using Evolutionary Algorithms", 2001, Proceedings of the Institution of Mechanical Engineers, Part B (Journal of Engineering Manufacture), vol. 215, No. B6, pp. 835-846.

International Preliminary Report on Patentability and Written Opinion of International Application No. PCT/US2008/080655 mailed May 6, 2010.

Office Action of Chinese Patent Application No. 200880112620.7 dated Dec. 7, 2011.

Search Report of Chinese Patent Application No. 2008801126207 dated Aug. 28, 2012.

Chinese Office Action and Search Report of Chinese Patent Application No. 200880112620.7 mailed Apr. 3, 2013.

\* cited by examiner

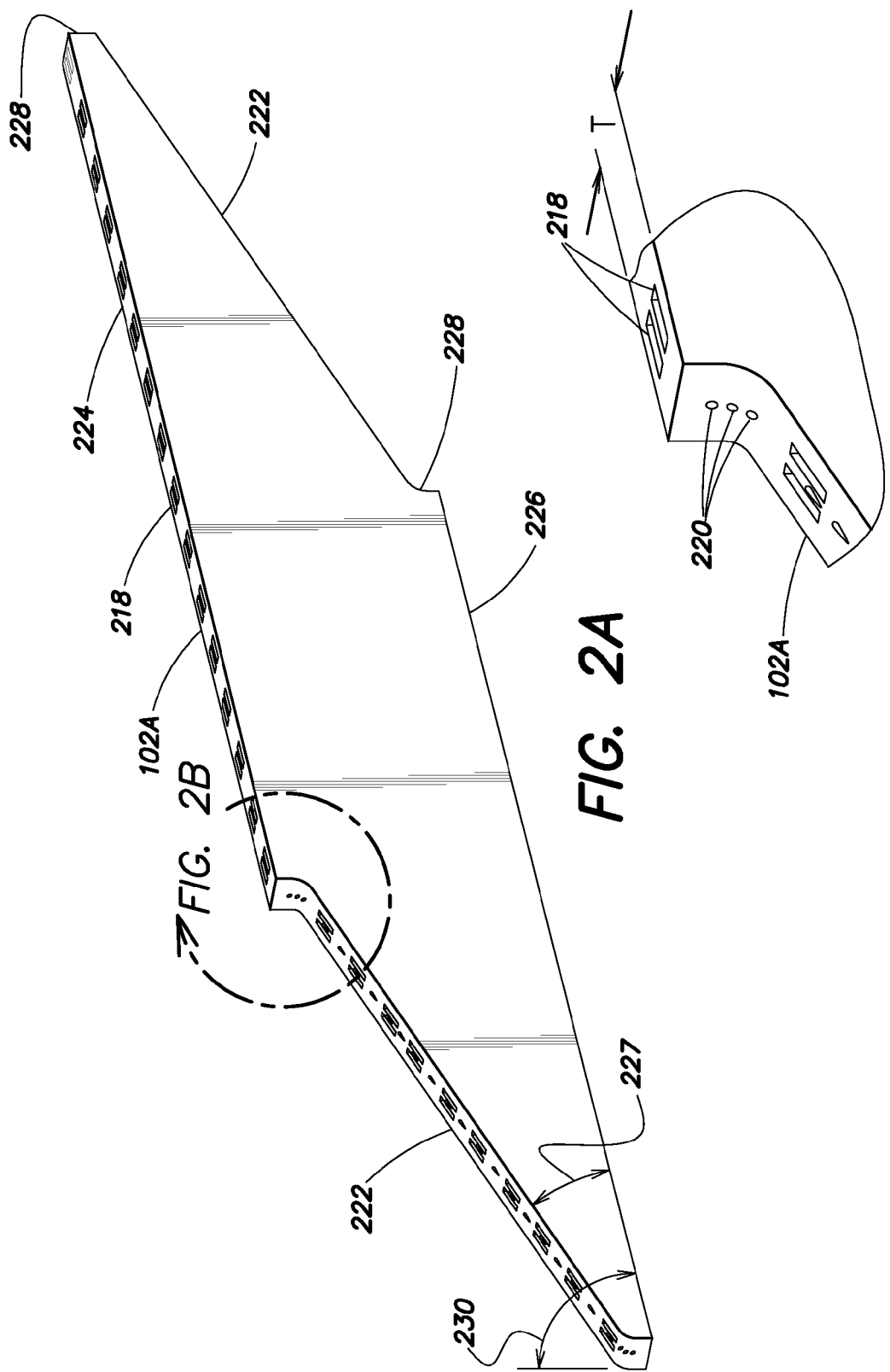

METHODS AND APPARATUS FOR TRANSPORTING SUBSTRATE CARRIERS

RELATED APPLICATIONS

The present application claims priority to U.S. Provisional Patent Application No. 60/981,818 filed Oct. 22, 2007, and entitled "METHODS AND APPARATUS FOR TRANSPORTING SUBSTRATE CARRIERS" which is hereby incorporated herein by reference in its entirety for all purposes.

FIELD OF THE INVENTION

The present invention relates to the transport of substrates on conveyor systems, and more particularly to methods and apparatus for the transport of substrate carriers in electronic device manufacturing systems.

BACKGROUND OF THE INVENTION

In the transport of substrates between tools or various processes within an electronic device manufacturing facility, substrate carriers may be used. Such substrate carriers house the substrates and may be carried on, and readily detached from, the conveyor system. Effective conveyor systems are sought which may transport the substrates without damaging them and convey the substrates and carriers quickly between various tools or locations in the facility.

SUMMARY OF THE INVENTION

In one aspect, a conveyor apparatus for transporting substrate carriers is provided. The conveyor apparatus includes a plurality of belt sections spliced together using a plurality of T-shaped stiffeners extending through each belt section wherein the belt sections entirely surround the T-shaped stiffeners along a portion of a length of the T-shape stiffeners; and a plurality of support wheels adapted to roll along a surface of the T-shaped stiffeners.

In another aspect, a conveyor apparatus for transporting substrate carriers is provided. The conveyor apparatus includes a belt section including a plurality of closed slots; and a plurality of T-shaped stiffeners extending in the closed slots.

In another aspect, a conveyor apparatus for transporting substrate carriers is provided. The conveyor apparatus includes a belt section including two slots spaced on either side of a centerline of the belt section; and a T-shaped stiffener including two legs, the two legs extending in the slots.

In another aspect, a conveyor apparatus for transporting substrate carriers is provided. The conveyor apparatus includes a plurality of flexible belt sections including reinforcing tension members spliced together along diagonally formed ends of the belt sections using a plurality of T-shaped stiffeners received in slots wherein the T-shaped stiffeners extend through each flexible belt section and beyond a bottom of the flexible belt sections wherein the flexible belt sections entirely surround the T-shaped stiffeners along a portion of a length of the T-shape stiffeners and wherein the flexible belt sections include smooth surfaces on both sides of the flexible belt sections; clamps attached onto a bottom end of the T-shaped stiffeners to secure the T-shaped stiffeners to the flexible belt sections; a cradle attached to at least some of the T-shaped stiffeners, the cradle adapted to hold a substrate carrier; a plurality of support wheels adapted to roll along a bottom surface of a crown of the T-shaped stiffeners; and a plurality of guide wheels adapted to roll on the smooth surfaces of both side of the flexible belt sections.

In another aspect, a conveyor apparatus for transporting substrate carriers is provided. The conveyor apparatus includes a flexible belt section including diagonally formed ends and a plurality of sets of two slots spaced on either side of a centerline of the belt section; a plurality of T-shaped stiffeners each including a crown and two legs, the two legs received in at least some of the sets of two slots; and clamps attached onto a bottom end of the T-shaped stiffeners to secure the T-shaped stiffeners to the flexible belt section.

In a further aspect, a method of forming a conveyor apparatus for transporting substrate carriers is provided, including the steps of providing a belt including a plurality of slots; and receiving T-shaped stiffeners in the slots wherein the belt entirely surrounds at least a portion of the T-shaped stiffeners along their length.

In yet another aspect, a method of forming a conveyor apparatus for transporting substrate carriers is provided. The method includes the steps of providing a plurality of belt sections, each including a diagonally-formed end and wherein each diagonally-formed end includes a plurality of slots; and splicing together the belt sections with a plurality of T-shaped stiffeners extending in the slots.

Numerous other aspects are provided in accordance with these and other aspects of the invention. Other features and aspects of the present invention will become more fully apparent from the following detailed description, the appended claims, and the accompanying drawings.

BRIEF DESCRIPTION OF THE DRAWINGS

FIG. 2A is a perspective view of a flexible belt segment of a conveyor apparatus of the present invention.

FIG. 2B is an enlarged perspective view of a segment of a flexible belt segment of FIG. 2A.

DETAILED DESCRIPTION

The present invention is directed at conveyor apparatus and methods for conveying objects such as substrates housed in substrate carriers which are used in the manufacture of electronic devices. The conveyor apparatus includes a flexible belt section which includes T-shaped stiffeners. The T-shaped stiffeners may be embedded in the belt or surrounded by the belt along at least a portion of their length. Objects such as cradles and/or substrate carriers may be suspended from the T-shaped stiffeners or from the belt sections themselves. The T-shaped stiffeners may be used to form a splice joint in the belt between belt sections wherein the T-shaped stiffeners may be received in slots formed in diagonally-formed ends of the belt sections to be spliced. Providing the stiffeners internally in the belt, by embedding or receipt in slots, allows for the formation of smooth surfaces on the sides of the belt for contact by guide rollers. Accordingly, vibration during conveyor motion may be reduced.

Further details of exemplary embodiments of the present invention are described with reference to FIGS. 1-9 herein.

The following specific embodiments are provided as examples of the present invention and are intended to be merely illustrative of some possible means of practicing the invention.

Figure 1:
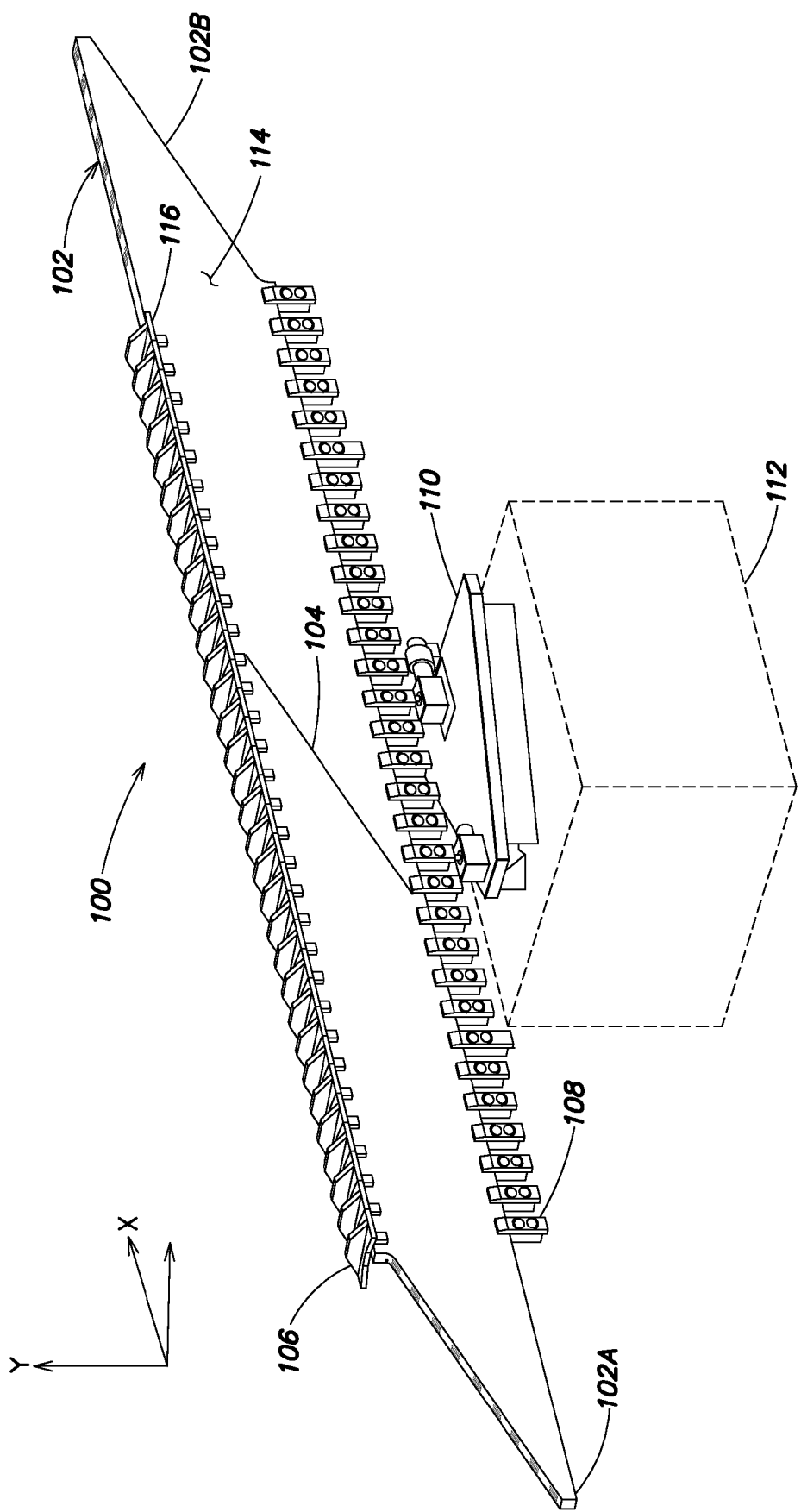
FIG. 1 is a perspective view of a conveyor apparatus for transporting substrate carriers of the present invention.
Figure 7:
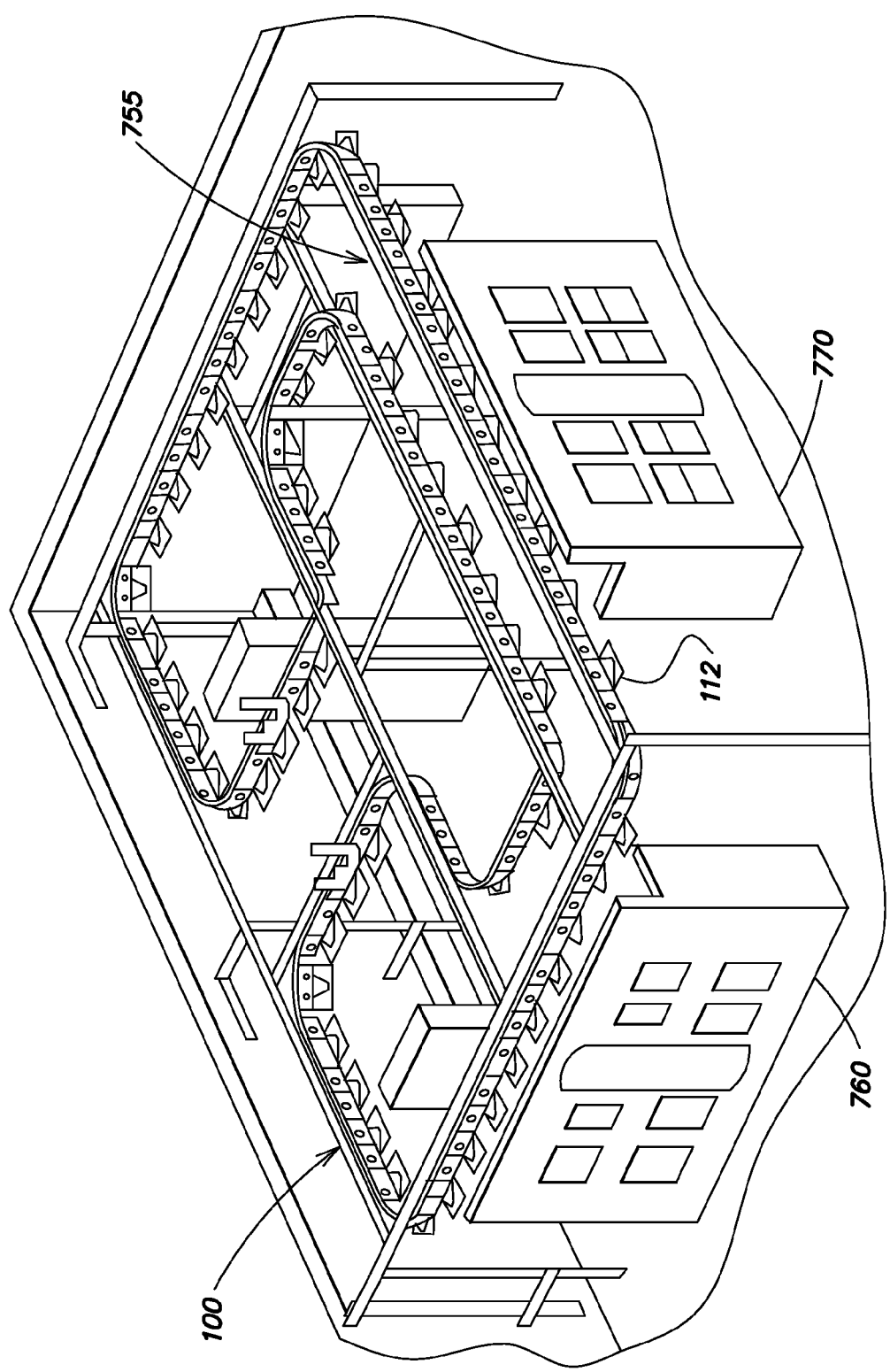
FIG. 7 is a perspective view of an embodiment of a conveyor apparatus illustrating a serpentine assembly of the present invention.

Referring to FIG. 1, an inventive conveyor apparatus 100 for a high speed transport system according to the present invention is illustrated. The conveyor apparatus 100 may include one or more flexible belt sections, such as first and second belt sections 102A, 102B (e.g., made of polyurethane or other suitable flexible polymer material) that are connected by splice joints (one splice joint 104 shown). The conveyor apparatus 100 may be formed into a closed loop (see FIG. 7 illustrating a serpentine closed loop) by splicing the beginning of a first belt section 102A to an end of a last belt section 102B to form a splice, such as splice 104 shown in FIG. 1.

A plurality of T-shaped stiffeners 106 may be embedded in each of the belt sections 102A, 102B of a belt 102, for example. The stiffeners 106 may be included either during the belt manufacturing process (e.g., molded in), or inserted into slots formed in the belt sections after each belt section is manufactured (the slots will be described in more detail with reference to FIGS. 2A-2B).

T-shaped stiffeners 106 may be made of a material (e.g., aluminum, titanium, etc.) that may be stiffer than the belt sections 102A, 102B. The stiffeners 106 may provide stiffness and resistance to conveyor apparatus 100 in bending about the x-axis, without appreciably increasing stiffness or reducing flexibility about the y-axis. The stiffeners 106 may be longer than a belt section height (h), so that the stiffeners extend beyond the bottom of the belt section when fully inserted. Clamps 108 may attach onto a bottom end of the T-shaped stiffeners 106 to secure them to the belt sections (e.g., 102A, 102B). When extending beyond the bottom of the belt sections, the stiffeners 106 and/or attached clamps 108 may provide a mounting point for attaching an object (e.g., a cradle 110 adapted for holding a substrate carrier 112 (shown dotted)). The carrier 112 may transport one or more substrates (not shown) between stations in an electronic device manufacturing facility, for example (see FIG. 7).

Alternatively, a length of the stiffeners 106 may be less than or equal to the belt section height (h), so that the stiffeners do not extend beyond the bottom of the belt section (e.g., 102A, 102B) when inserted. In this case, objects may still be attached to the stiffeners 106 through one or more holes formed in the belt section or sections 102A, 102B. A cradle 110 adapted for carrying an object (e.g., a substrate carrier) may be attached to the bottom of the T-shaped stiffener 106. Alternatively, the cradle 110 could be attached directly to the belt 102. Attachment of the cradle 110 to the T-shaped stiffener 106 may provide a more rigid attachment point than attachment to the belt 102. The conveyor apparatus 100 may be guided along a curved path using a plurality of guide wheels or rollers that contact the smooth sides of the belt (see FIG. 8 for example). An advantage of the use of embedded T-shaped stiffeners 106 is that there is a smooth, continuous belt surface 114 on both sides of the belt 102 on which the guide wheels can roll. This may reduce vibration, noise, and/or wear on the guide wheels which might otherwise cause potentially contaminating particle generation.

The conveyor apparatus 100 may be supported in the vertical direction along the Y axis by additional support wheels that contact with a bottom surface 116 of the T-shaped stiffener 106. In this way, the conveyor apparatus 100 may be suspended in the air above a work area, e.g., electronic device manufacturing facility, and may be guided along a serpentine path, for example.

Referring to FIGS. 2A and 2B, the belt sections (e.g., 102A) may have one or more vertical slots 218 extending along the y-axis for inserting the T-shaped stiffeners 106. The slots 218 may be of any shape such as holes having a rectangular or square cross section. The slots 218 may include four sides in cross section. In particular, a slot 218 may be closed, such that it surrounds entirely a radial periphery of the T-shaped stiffener 106 along at least a portion of a length of the stiffener. For example, each stiffener location along a longitudinal length of the belt may have two slots 218 that may be located on either side of a centerline of the section 102A of the belt. In some embodiments, the slots 218 may be symmetrically located about the centerline of the section 102A of the belt and may extend entirely through the belt section 102A in the vertical dimension along the y-axis. This configuration may allow one or more tension members 220 to be located along the centerline and extend along a length of the belt section 102A of the belt, for example.

In some embodiments, the tension members 220 may be made from stranded steel, Kevlar cord, or other such suitable materials. Placing one or more tension members 220 along the centerline of the belt section 102A may provide additional tensile stiffness without appreciably increasing a bending stiffness of the belt section 102A of the belt. Also, providing two symmetric slots 218 for inserting the T-shaped stiffeners 106 may provide for a bending stiffness which may be substantially the same for bends to the left and to the right. In addition, a cross-sectional thickness (t) of the belt section 102A may be substantially uniform from bottom to top. Therefore, the bending stiffness at the top, bottom, and all points in between may be approximately the same, which may ensure that the belt sections 102A, 102B may bend uniformly. If the stiffness at the top were larger, for example, the belt sections may tend to bend in a larger radius at the top than at the bottom, possibly causing out-of-plane deformation which may result in lateral movement of cradles 110 attached to the conveyor apparatus and objects such as substrate carriers that are carried by the cradles.

Additionally, as shown best shown in FIG. 2A, ends 222 of the belt sections 102A may include, on one or both ends, angled cuts whereby the belt ends 222 are formed at other than a 90 degree angle to a top and/or bottom 224, 226 of the belt section. For example, a first angle 227 may measure between about 20 degrees and about 70 degrees, or even between about 40 degrees and 50 degrees, for example. Other angles may be used. The angled cut may provide ease of splicing of the belt sections as will be discussed below herein. To further aid in alignment of the respective abutting belt sections 102A, 102B, an alignment feature 228 may be added on one or both belt ends 222 which may provide a transition zone. The transition zone may provide a geometrical feature such that a juncture between an end 222 and the top 224 and/or bottom 226 of a belt section 102A, 102B does not break out at a relatively shallow acute angle, but rather a second angle 230 which may be larger than the first angle 227, for example. Second angle 230 may measure between about 60 and 120 degrees for example, and may be about 90 degrees in some embodiments. Other angles may be used.

Figure 3B:
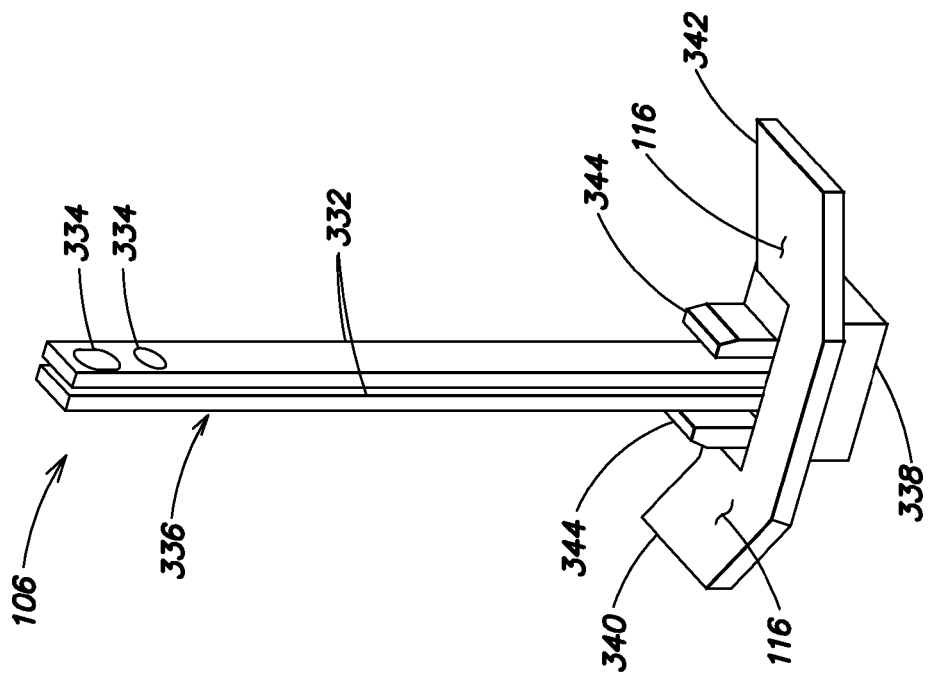
FIG. 3B is a bottom perspective view of an embodiment of a T-shaped stiffener of FIG. 3A.
Figure 3A:
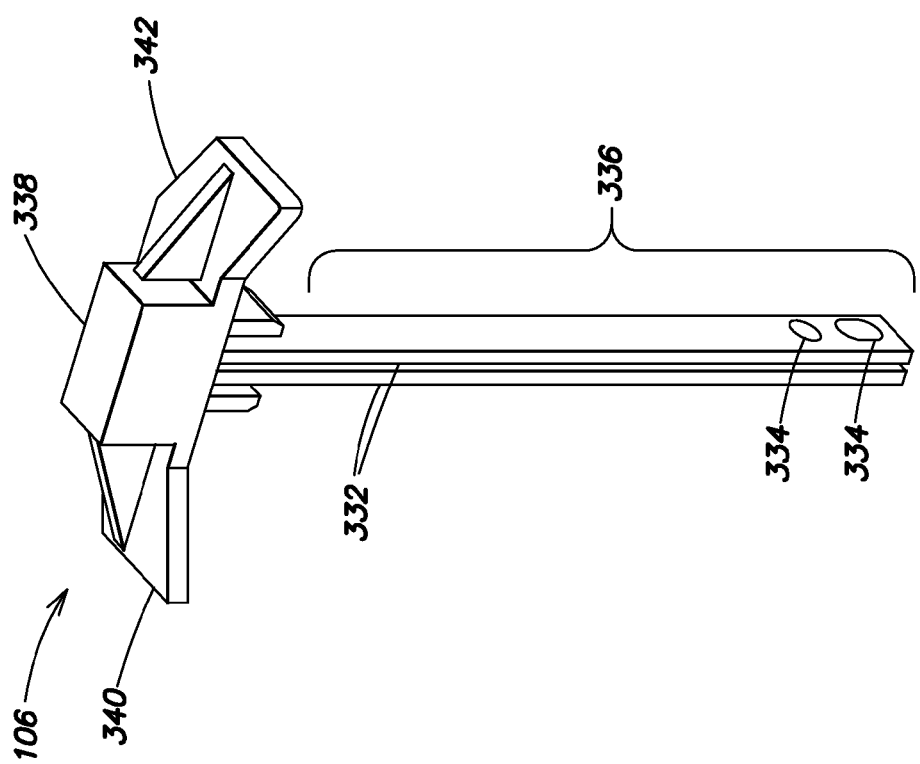
FIG. 3A is a top perspective view of an embodiment of a T-shaped stiffener of the present invention.

Referring now to FIGS. 3A and 3B, top and bottom perspective views, respectively, of a T-shaped stiffener 106 are illustrated. The T-shaped stiffener 106 may have forked legs 332 that may be inserted into the parallel slots 218 formed in the belt sections. At the bottom of the forked legs, there may be features, such as holes 334 for attaching various objects. The attached objects may include, as best shown in FIG. 1, a clamp such as clamp 108 for preventing the T-shaped stiffener 106 from sliding out of the belt section and/or a cradle 110 for carrying work pieces such as a substrate carrier 112. In some embodiments, the cradle may connect to the clamp 108.

In more detail, the T-shaped stiffener 106 may include an upright portion 336 composed of one or more legs 332, and a crown 338 of the "T" composed of a first and second lateral support 340, 342, respectively. The lateral supports 340, 342 extend laterally from the upright portion 336 to form the T shape. The upright portion 336 and crown 338 may be made from an integral, one-piece construction, or from a two-piece construction whereby the crown 338 would be pinned, screwed, bolted, or otherwise fastened to the upright portion 136. Tabs 344 may be located on either side of the belt to thereby provide further strength reinforcement of an interface region between the upright portion 336 and the crown 338. As will be described below in more detail, the lateral supports 340, 342 may include an asymmetric offset profile shape such that each support extends forward in a longitudinal direction beyond the front of the upright portion 336. A bottom surface 116 of the crown 338 may be generally planar.

Figure 4A:
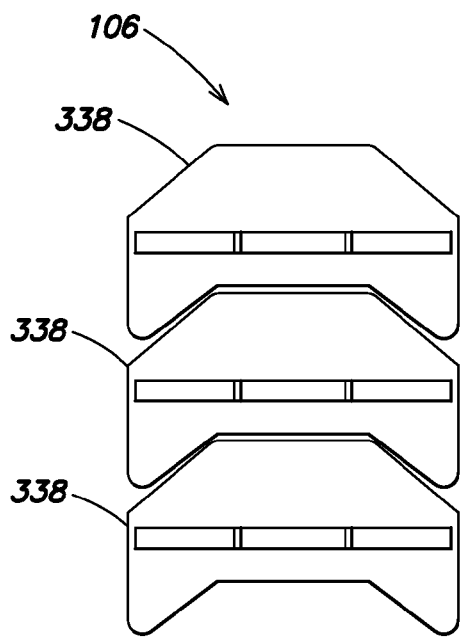
FIG. 4A is a top plan view of a segment of a conveyor apparatus for transporting substrate carriers including T-shaped stiffeners of the present invention shown undeflected.
Figure 4B:
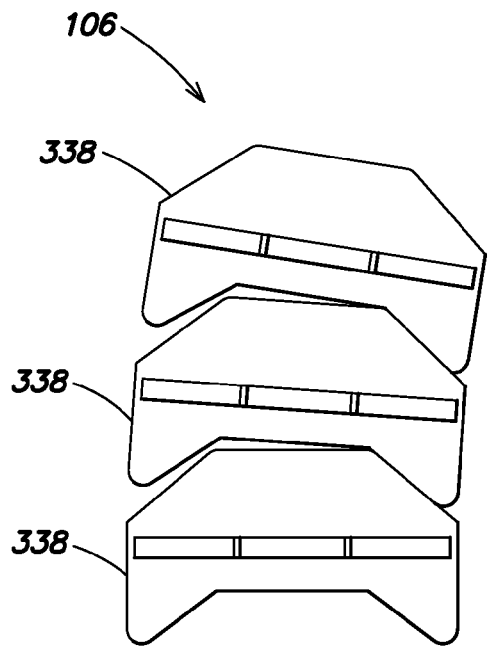
FIG. 4B is a top plan view of a segment of a conveyor apparatus for transporting substrate carriers including T-shaped stiffeners of the present invention shown deflected.
Figure 4C:
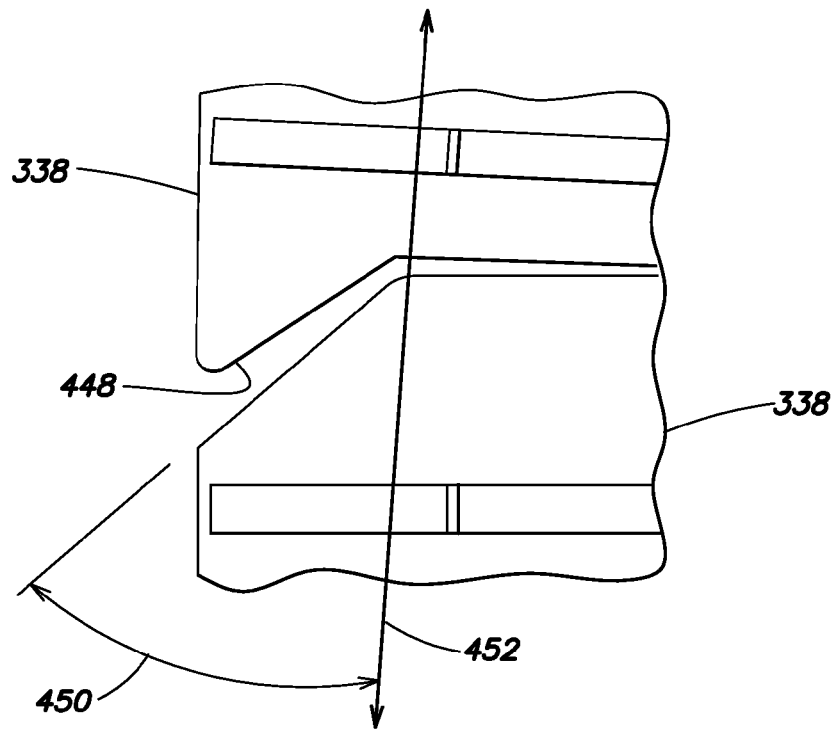
FIG. 4C is an enlarged top plan view of a portion of the segment of a conveyor apparatus of FIG. 4B.

Now referring to FIGS. 4A-4C, which illustrate several top views of T-shaped stiffeners 106. Since the bottom surfaces 116 of the crowns 338 of the T-shaped stiffeners 106 may run on vertical support wheels (not shown), any gap between the adjacent crowns may cause a break in the running surface, resulting in noise and/or vibration and possibly particle generation. Thus, a profiled shape of the crown 338 may be chosen to minimize the gap between the crown of each stiffener, as well as provide enough clearance to allow bending of the band sections at a chosen bend radius (the "design radius").

As shown in FIG. 4B which illustrates a belt segment bending about the y-axis, the crown profile is chosen so that one side of the crowns 338 will contact each other when the bend radius is equal to the design radius. In operation, the minimum bend radius may be slightly larger than the design radius to guarantee that the crowns will never touch, since touching could cause wear, particles, noise, and vibration.

In addition, as best shown in FIG. 4C, an edge profile of the crown 338 may be chosen such that an edge 448 of the crown 338 is positioned at an angle 450 with respect to the tire line 452 of contact in the area where the crown makes contact with the vertical guide wheel. In this way, the wheel is in contact with at least one crown at all times, and is in contact with adjacent crowns as it transitions from one crown to the next. This may improve the operational smoothness, reduces noise, and reduces vibration.

Figure 5A:
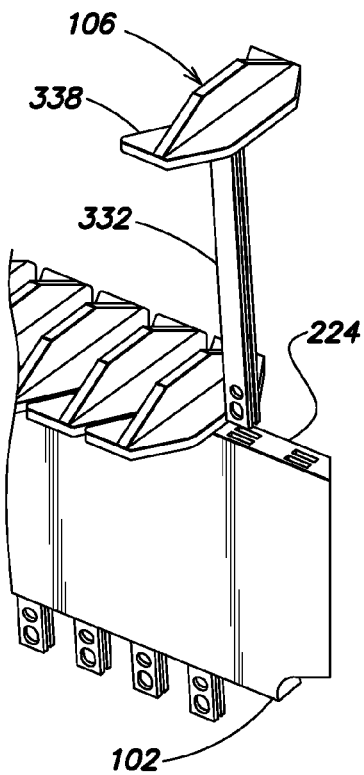
FIGS. 5A-5D are perspective views of an embodiment of a conveyor apparatus illustrating an assembly of T-shaped stiffeners into a flexible belt of the present invention.
Figure 5B:
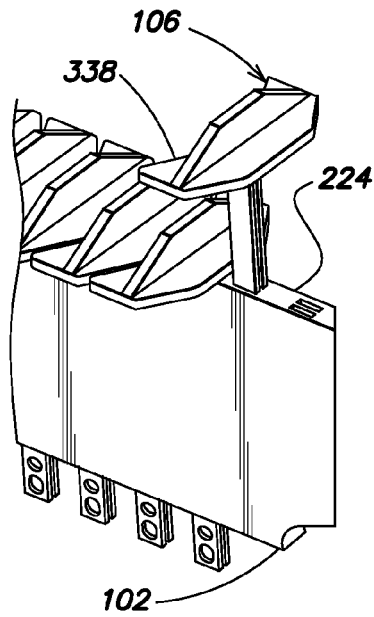
Figure 5C:
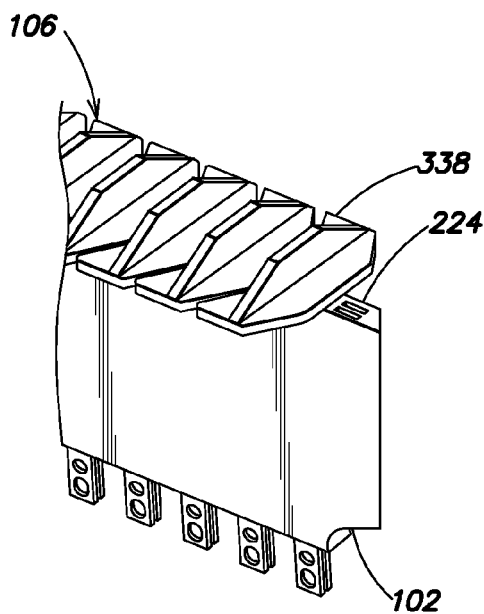

Referring to FIGS. 5A-5D, a process of inserting the T-shaped stiffeners 106 into the belt 102 is depicted. Each of the T-shaped stiffeners 106 may be inserted into the belt 102 by sliding the forked legs 332 of a stiffener 106 into the two parallel slots on the belt (as shown in FIGS. 5A & 5B). The stiffener 106 slides in until it makes contact with the top surface 224 of the belt 102 to ensure that each stiffener 106 is inserted precisely the same distance into belt 102. This allows the bottom surface of each crown 338 to be essentially coplanar with adjacent crowns, which provides a smooth, even surface under which the vertical support wheels will roll.

Figure 5D:
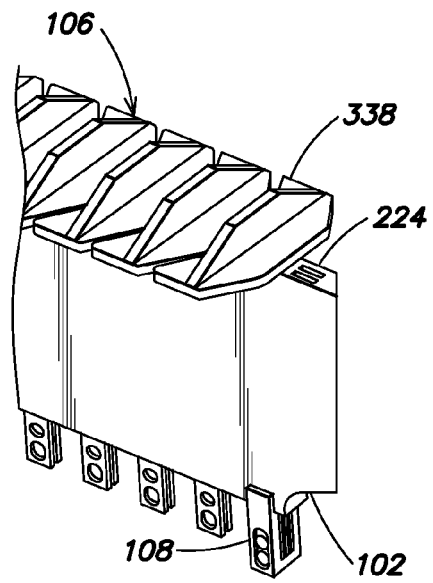

In addition, a clamp 108 may be mounted to the stiffener 106 using the attachment features at the bottom of the forked legs (as shown in FIG. 5D) to ensure that the stiffener 106 does not back out of the belt sections during use.

Figure 6A:
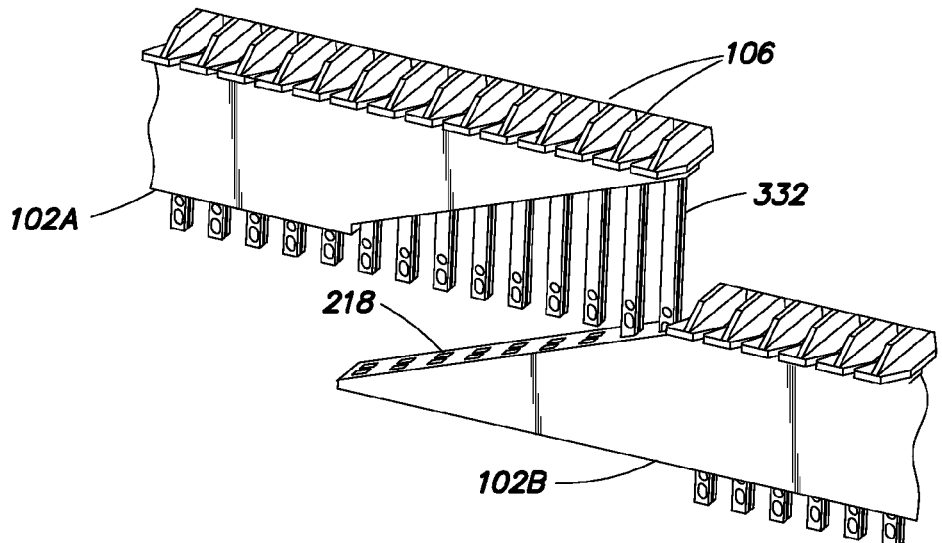
FIGS. 6A-6C are perspective views of an embodiment of a conveyor apparatus illustrating assembly of a splice joint of the present invention.
Figure 6B:
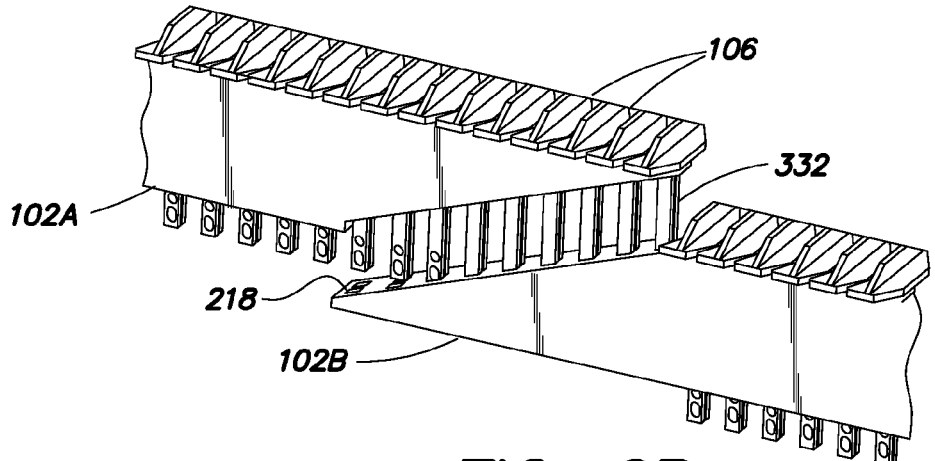
Figure 6C:
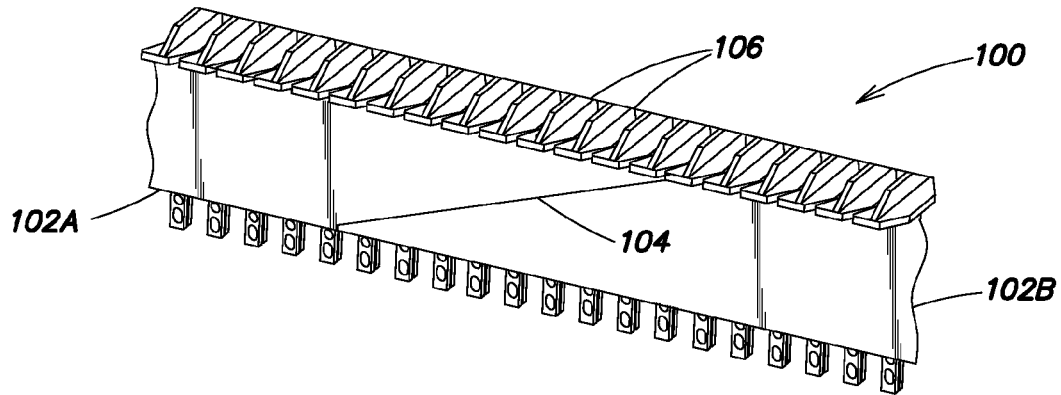

Referring to FIGS. 6A-6C, a process of splicing together belt sections to form a conveyor apparatus 100 is shown. The conveyor apparatus 100 may be any length that is suitable for a particular manufacturing, transporting, and manipulating application. Both ends of the belt sections 102A, 102B are, as previously described, shaped substantially diagonally, such that the ends of the belt sections can be brought together and such that the ends line up with substantially no gaps and substantially no overlap as shown. The ends of the belt sections are held together by inserting the legs 332 of the T-shaped stiffeners 106 through the slots 218 in both belt sections 102A, 102B as shown in FIGS. 6A-6C. This provides a method of splicing that does not require fasteners on the sides of the belt sections which might obstruct the guide/drive wheels. Similarly, the design does not appreciably affect the bending properties of the belt in the area of the splice joint 104, such as the stiffness about the x-axis, flexibility about the y-axis.

Figure 8:
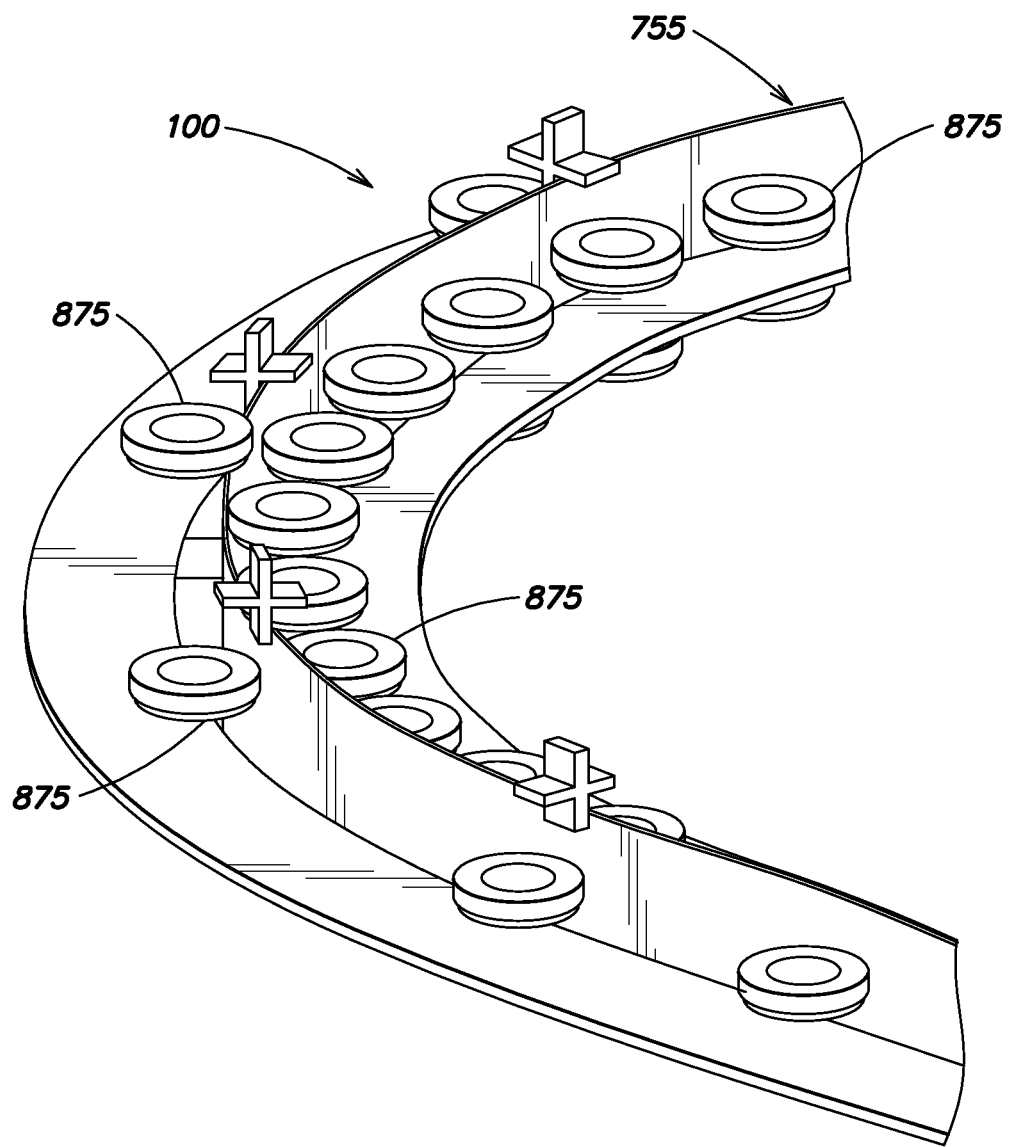
FIG. 8 is a perspective view of an embodiment of a conveyor apparatus illustrating a guide wheel assembly of the present invention.

Referring to FIGS. 7 & 8, since the assembled conveyor apparatus 100 is flexible about the y-axis, a closed loop of belt sections spliced together to form a conveyor may be guided along a serpentine path 755 to several work stations (e.g., stations 760, 770). Work pieces such as substrate carriers 112 may be carried on the cradles 110 that are attached to either the stiffeners or directly to the belt sections. In this way, the conveyor apparatus 100 may be used to move work pieces (e.g., substrate carriers) to and from work stations that load and unload the carriers. Also, since the conveyor apparatus 100 is rigid about the x-axis due to the stiffness of the T-shaped inserts, any centripetal force caused by moving the weight of the work piece through curved segments of the conveyor's path does not cause significant bending or deflection of the conveyor when the work piece travels at high speed.

The guiding of the conveyor apparatus 100 along the path 755 may be accomplished by using horizontal guide wheels 875. A larger number of guide wheels 875 may be used on the inner diameter of the curve and a smaller number on the outer diameter.

Alternatively or in addition to the features described above, some embodiments of the conveyor apparatus of the present invention may include the following features.

Figure 9:
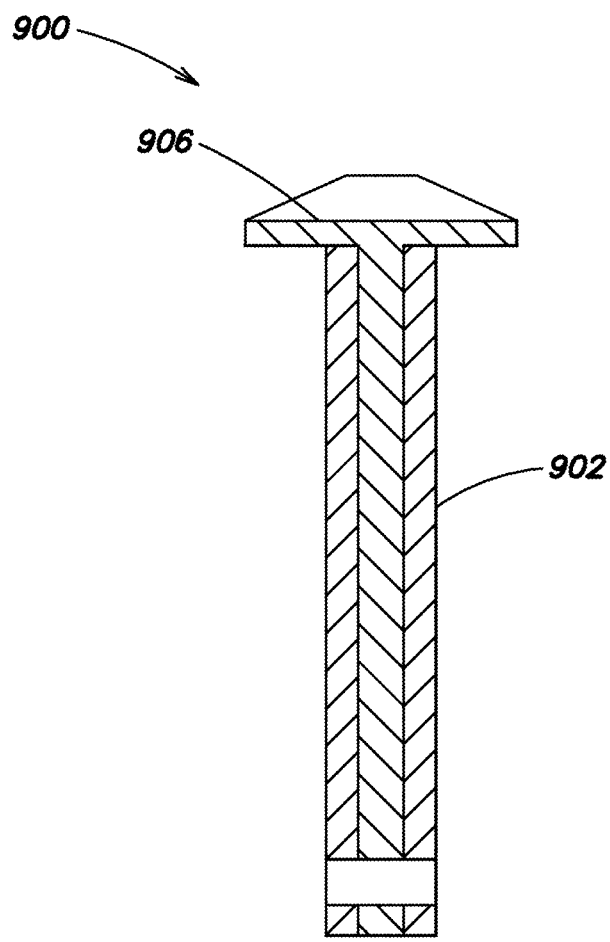
FIG. 9 is a cross-sectioned side view of an embodiment of a conveyor apparatus of the present invention.

The T-shaped stiffener 906 may be completely or partially embedded in the belt sections 902, and not attached to the belt using fasteners as shown in the conveyor apparatus 900 of FIG. 9. Rather, T-shaped stiffener may be pre-inserted into the belt sections during a molding or extrusion process. Both sides of the belt sections 902 may be completely smooth, for example. As shown in FIG. 9, the belt sections may be symmetric about a vertical mid-plane of the belt so that it has equal bending stiffness about the y-axis. The belt sections may be substantially uniform in thickness in the vertical direction along the y-axis, so the bending stiffness about the y-axis at the top and bottom of the belt is the same, which ensures that the belt sections and the conveyor bend uniformly along the length of the belt. The material used to make the belt sections may be electrostatic dissipative, so that a static charge does not build up as the conveyor runs. Some or all of the guide wheels may be conductive and may be electrically connected to a ground path, so that all static charges generated on the belt sections can flow to ground.

Because the entire side surfaces of the belt sections may be smooth, the guide wheels may be positioned as close to the top and bottom of the belt sections as possible and this placement minimizes the bending moment caused by centripetal forces from the cradle and carried objects when traveling through a turn.

The present invention conveyor apparatus may allow for ease of attachment of objects and ease of driving via drive wheels in contact with the surface of the apparatus. For other designs where fasteners are used on a side of the belt to attach a stiffener to the belt, the belt cannot be guide or driven in the area of the fasteners, consequently such designs may not allow optimal guide/drive wheel placement.

The foregoing description discloses only exemplary embodiments of the invention. Modifications of the above-disclosed apparatus and methods which fall within the scope of the invention will be readily apparent to those of ordinary skill in the art. For instance, the apparatus and methods described herein may be used in other applications and may also be used in other environments. The invention may also be realized utilizing other materials or configurations.

Accordingly, while the present invention has been disclosed in connection with exemplary embodiments thereof, it should be understood that other embodiments may fall within the spirit and scope of the invention, as defined by the following claims.

The invention claimed is:

1. A conveyor apparatus for transporting substrate carriers, comprising:
a plurality of belt sections spliced together using a plurality of T-shaped stiffeners extending through each belt section, at least some of the plurality of T-shaped stiffeners extending through two of the belt sections to splice the two of the belt sections together, wherein the T-shaped stiffener includes an upright portion and a crown, wherein the belt sections include slots to receive and encase at least a portion of a length of the upright portion of the T-shaped stiffeners inserted therein.

2. The conveyor apparatus of claim 1 wherein the belt sections comprise a flexible polymer material.

3. The conveyor apparatus of claim 1 further comprising reinforcing tension members in the belt sections adapted to add strength to the belt sections.

4. The conveyor apparatus of claim 1 wherein the T-shaped stiffeners are embedded in the belt sections.

5. The conveyor apparatus of claim 1 wherein the T-shaped stiffeners are stiffer than the belt sections in bending about an x-axis.

6. The conveyor apparatus of claim 1 wherein the T-shaped stiffeners are molded into the belt.

7. The conveyor apparatus of claim 1 wherein the T-shaped stiffeners are removably inserted into slots formed in the belt sections.

8. A conveyor apparatus for transporting substrate carriers, comprising:
a plurality of belt sections spliced together using a plurality of T-shaped stiffeners extending through each belt section, wherein the T-shaped stiffener includes an upright portion and a crown, wherein the belt sections include slots to receive and entirely surround at least a portion of a length of the upright portion of the T-shaped stiffeners inserted therein;
a plurality of support wheels adapted to roll along a surface of the T-shaped stiffeners; and
clamps attached onto a bottom end of the T-shaped stiffeners to secure the T-shaped stiffeners to the belt sections.

9. A conveyor apparatus for transporting substrate carriers, comprising:
a plurality of belt sections spliced together using a plurality of T-shaped stiffeners extending through each belt section, wherein the T-shaped stiffener includes an upright portion and a crown, wherein the belt sections include slots to receive and entirely surround at least a portion of a length of the upright portion of the T-shaped stiffeners inserted therein; and
a plurality of support wheels adapted to roll along a surface of the T-shaped stiffeners;
wherein the T-shaped stiffeners extend beyond a bottom of the belt sections.

10. The conveyor apparatus of claim 1 further comprising a cradle attached to the T-shaped stiffener, the cradle adapted to hold a substrate carrier.

11. The conveyor apparatus of claim 1 wherein the T-shaped stiffeners are embedded in the belt sections and the belt sections include a smooth belt surface on both sides of the belt sections on which a plurality of guide wheels can roll.

12. The conveyor apparatus of claim 1 further comprising a plurality of support wheels adapted to roll along a surface of the T-shaped stiffeners wherein the support wheels contact a bottom surface of the crown on the T-shaped stiffener.

13. The conveyor apparatus of claim 1 further comprising a plurality of support wheels adapted to roll along a surface of the T-shaped stiffeners wherein the crown of the T-shaped stiffener includes an edge formed at an angle with respect to a tire line of contact of the support wheels.

14. The conveyor apparatus of claim 1 wherein one or more legs of the upright portion of the T-shaped stiffener is received in one or more slots formed in the belt section.

15. The conveyor apparatus of claim 1 wherein a plurality of T-shaped stiffeners are received in slots formed in diagonally formed ends of the belt sections to form a splice joint.

16. A conveyor apparatus for transporting substrate carriers, comprising:
a plurality of flexible belt sections including reinforcing tension members spliced together along diagonally formed ends of the belt sections using a plurality of T-shaped stiffeners inserted in slots of the belt, wherein the T-shaped stiffener includes an upright portion and a crown, and wherein the upright portion of the T-shaped stiffeners extends through each flexible belt section and beyond a bottom of the flexible belt sections wherein the flexible belt sections entirely surround the T-shaped stiffeners along a portion of a length of the upright portion of the T-shape stiffeners and wherein the flexible belt sections include smooth surfaces on both sides of the flexible belt sections;
clamps attached onto a bottom end of the upright portion of the T-shaped stiffeners to secure the T-shaped stiffeners to the flexible belt sections;
a cradle attached to at least some of the T-shaped stiffeners, the cradle adapted to hold a substrate carrier;
a plurality of support wheels adapted to roll along a bottom surface of the crown of the T-shaped stiffeners; and
a plurality of guide wheels adapted to roll on the smooth surfaces of both side of the flexible belt sections.

17. A conveyor apparatus, comprising:
- a belt section including a plurality of closed slots; and
- a plurality of T-shaped stiffeners, each including an upright portion and a crown, where the upright portion is inserted in the closed slots,
- wherein the T-shaped stiffeners are stiffer than the belt section in bending about an x-axis.

18. A conveyor apparatus for transporting substrate carriers, comprising:
- a belt section including two slots spaced on either side of a centerline of the belt section; and
- a T-shaped stiffener including an upright portion and a crown, wherein the upright portion includes two legs, the two legs inserted into the slots,
- wherein the T-shaped stiffener is stiffer than the belt section in bending about an x-axis.

19. A conveyor apparatus for transporting substrate carriers, comprising:
- a flexible belt section including diagonally formed ends and a plurality of sets of two slots spaced on either side of a centerline of the belt section;
- a plurality of T-shaped stiffeners each including a crown and two legs, the two legs inserted in at least some of the sets of two slots; and
- clamps attached onto a bottom end of the T-shaped stiffeners to secure the T-shaped stiffeners to the flexible belt section.

20. The conveyor apparatus of claim 1 wherein the plurality of belt sections include entirely smooth surfaces on both sides.

* * * * *